L. T. MANN.
POWER TRANSMISSION FROM CAR TRUCK AXLES.
APPLICATION FILED AUG. 20, 1906.
910,211.
Patented Jan. 19, 1909.
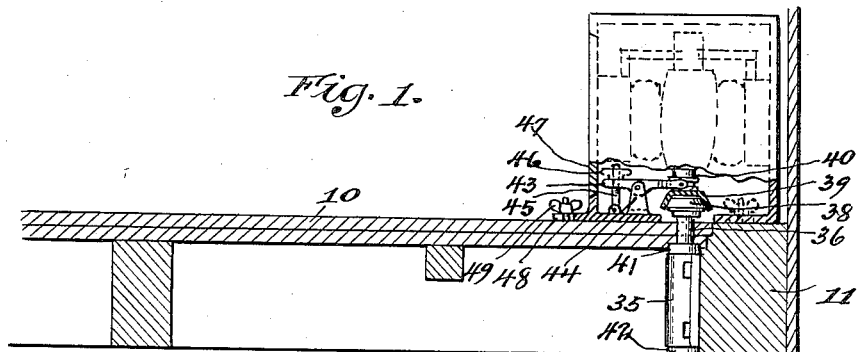
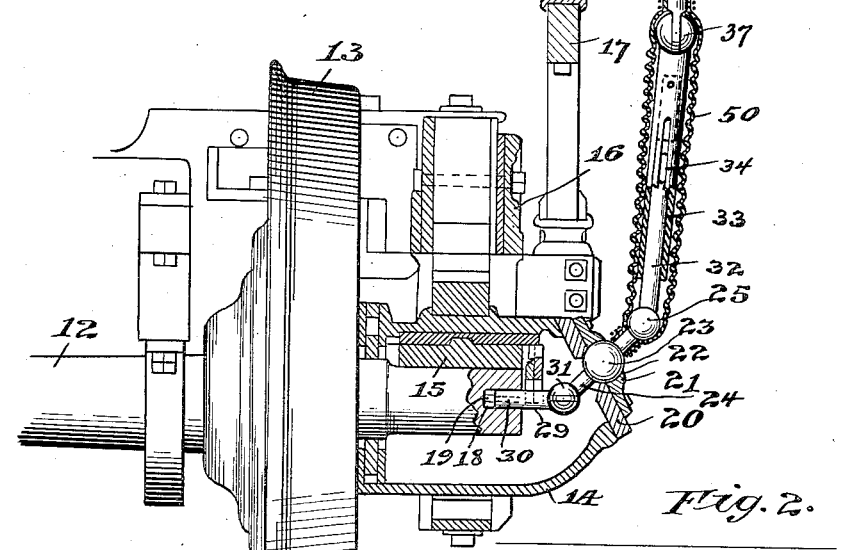
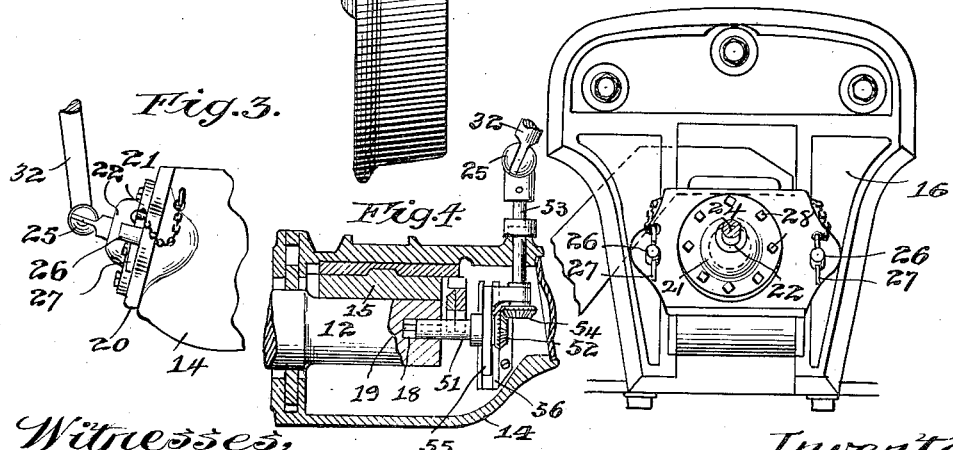
Witnesses,
Walter M. Fuller
C. E. Wessels.
Inventor,
Louis T. Mann
By Offield Towle & Linthicum
Attys.

UNITED STATES PATENT OFFICE.

LOUIS T. MANN, OF CHICAGO, ILLINOIS.

POWER TRANSMISSION FROM CAR-TRUCK AXLES.

No. 910,211.          Specification of Letters Patent.          Patented Jan. 19, 1909.

Application filed August 20, 1906. Serial No. 331,333.

*To all whom it may concern:*

Be it known that I, LOUIS T. MANN, a citizen of the United States, residing at Chicago, in the county of Cook and State of Illinois, have invented certain new and useful Improvements in Power Transmission from Car-Truck Axles, of which the following is a specification.

My invention pertains to means for transmitting power from an axle of a car truck for the purpose of driving a lighting dynamo located in or beneath the car-body or for any other purpose.

Preferably, though not exclusively, my improved transmitting means is used in connection with the middle axle of a six-wheel truck, such for example as is employed at the present day on standard Pullman cars. The transmitting or connecting shaft or shafts are associated with the end of the axle, desirably within the journal box, and the required change of direction of the shaft to reach the dynamo or other driven device may be effected by gears, universal joints, or the like, or combinations of the different forms of mechanism mentioned. By employing such simple means for transmission of the power and locating them at the end of the axle, cars now in use may be readily and economically equipped with my improved device. It is apparent that due to the turning of the truck around the king bolt and center bearing as the car traverses curves in the line of way and track some sort of lengthening and shortening mechanism must be used in connection with the supplemental or dynamo driving shaft. Several forms of means for accomplishing this function will readily be brought to mind, but I prefer to use a sliding connection comprising a tube or hollow shaft with which coöperates a rod or shaft adapted to fit therein, the tube and rod being splined or keyed together whereby the rotation of one causes a similar turning of the other but permitting the shaft as a whole to be elongated or shortened as required.

Another object of my invention is to make the dynamos of the various cars readily detachable and interchangeable thereby eliminating delays and inconvenience incident to the repair of damaged machines. An injured dynamo can be quickly removed from the car and replaced with one in good condition.

On the accompanying drawing forming a part of this specification I have illustrated the preferred embodiments of my invention, and on said drawing; Figure 1 is a vertical cross-section of a part of a car-body and its track illustrating my novel power transmitting mechanism applied to the end of the axle; Fig. 2 is a face view of the truck pedestal and journal box shown in Fig. 1; Fig. 3 is a fragmentary side elevation of the journal box and transmitting mechanism illustrated in Figs. 1 and 2; and Fig. 4 is a longitudinal section of a journal box showing a modification of the power transmitting means.

The car floor 10, side sill 11, truck axle 12, wheel 13, journal box 14, journal bearing 15, pedestal 16, and side bearing bridge 17 are of the usual and ordinary form and construction with the exception of the end of the axle which is axially apertured at 18 and provided with an internal longitudinal key way 19. It is my intention to derive power from the axle at the end within the journal box and, to accomplish this result, in place of the ordinary journal box lid I use a lid 20 which in connection with an additional bearing member 21 forms a bearing 22 adapted to accommodate a spherical enlargement or ball 23 on a short section of shaft 24, one portion of which projects into the journal box adjacent to the end of the axle while its opposite end protrudes from the box through lid 20 provided with the spherical bearing 22. Lid 20 may be maintained in position on the box by means of lugs or pins 26 on box 14 extending through holes in the lid, while locking pins 27 adapted to pass through transverse holes in pins 26 hold the lid securely in place. Bearing plate 21 may be fastened to the lid by screws or bolts 28, as shown, or in any other convenient and simple manner. A short shaft 29 is supplied at one end with a key or spline 30 to co-act with keyway 19 and is substantially the same diameter as aperture 18 within which it is adapted to fit and slide as the axle plays back and forth to a limited extent. A universal ball joint 31 connects the outer end of shaft 29 with the inner end of shaft 24, while the exterior end of the latter shaft is joined to the lower end of rod 32 by a like universal joint 25. The upper part of rod 32 fits within a tube 33, a slot and key connection 34 compelling the two to rotate together. Mounted in a box or bearing 35 fastened to any suitable part of the car-body, such as sill 11, is a shaft 36 having a universal joint connection 37 with tube 33 and a clutch connection 38, 39 with the armature shaft of a dynamo 40. To maintain shaft 36 in position and prevent its rising or lowering I provide it with collars 41 and 42 affixed thereto on opposite sides of bearing 35. The controlling lever 43 of the clutch is pivoted in a standard 44 on the casing of the dynamo and may be held in operative or inoperative position by a screw or bolt 45 and nut 46 accessible through a door 47 of the dynamo casing.

In order to enable the dynamo to be readily removed from the car in case it becomes injured or disabled and replaced with one in good condition I attach it to the car floor by means of a plurality of slotted feet 48 with which bolts and winged nuts 49 coöperate to detachably maintain the dynamo in proper position. To permit the dynamo to be readily raised and carried away I make the clutch member 39 of inverted cup shape whereby the friction clutch elements separate without difficulty or inconvenience when the dynamo and its casing are lifted. No delay need therefore be occasioned because of a burned-out or otherwise defective dynamo since an operative machine can be made to replace it with facility.

The operation of the device is as follows: The rotation of axle 12 causes the turning of shaft 19 through the spline connection 30 and inasmuch as shaft 29 does not reach the inner end of aperture 18 the shifting of the axle back and forth is satisfactorily cared for. Through the universal ball joint 31 shaft 24 is rotated and the latter in turn revolves rod 32 by means of universal joint 25. Spline 34 compels a corresponding turning of tube 33 which transmits its rotary motion to shaft 36 by the remaining universal ball coupling 37. The rotation of the dynamo armature of course depends upon whether or not the friction clutch element 39 is in operative or inoperative position. When the truck turns relative to the car-body the shaft joining the couplings 25 and 37 elongates or shortens automatically by the rod 32 telescoping more or less within its surrounding tube 33.

If desired the connections between the journal box and the car-body may be covered by a rubber or other suitable coating or sleeve 50 capable of stretching or elongating to prevent moisture or dirt having access to the parts.

The bearing 15 may become worn with use so that the axle changes position somewhat relative to the journal box lid, and it is to compensate for this descending of the journal box relative to the axle that the ball and socket bearing is provided in the lid and the universal connection 31 is employed. Such wearing of bearing 15 may slide shaft 29 slightly further within the axle aperture 18 but, as stated above, the aperture's depth or length is sufficient to permit such accommodation of parts to the new condition.

In Fig. 4 I have illustrated a modification of the structure shown in the other views. In this case the shaft protruding from the journal box rises through the top of the box and within the latter it has a bevel gear connection with the axle. As in the preferred embodiment journal box 14 has a bearing plate 15 resting upon the axle 12; and projecting axially from the axle and having a like spline and slot as well as sliding connection therewith is a short shaft 51 having a gear 52 affixed thereto at its outer end. Projecting through the top wall of the journal box 14 and rotatably mounted therein is an upright shaft 53 having at its lower end a bevel gear 54 meshing and coöperating with gear 52. Shaft 53 is connected to rod 32 by a universal coupling 25 and the construction above rod 32 is the same as in the other species. Gears 52 and 54 must be capable of a limited up and down movement without interfering with their meshing coöperation to allow for the wearing of bearing plate 15 or the insertion of a new one. Consequently, I mount the pair of gears in a right angle frame or bracket 55 which may reciprocate vertically in one or more grooved or slotted guides 56 secured to or cast integral with one or both inner faces of the sides of the box. As the journal box descends due to the wearing of bearing 15 shaft 53 will rise more out of the box sliding through its bearing in the top wall of the box, but the gears will be held constantly in proper intermeshing position by frame 55. The rise of shaft 53 is compensated for by a corresponding telescoping of rod 32 and tube 33. The operation of this modification is obvious and does not require further description.

Although I have described and illustrated my power transmitting mechanism in connection with the middle axle of a six-wheel truck, and with a dynamo for car lighting on the car body it will be readily understood that it is not limited to such use and position of the dynamo and may be used with or without minor modifications for various purposes and in other relations without departure from the substance of my invention.

I claim:

1. In a car, the combination of a car wheel axle, a suitably-supported driven mechanism, and driving means connecting an end of said car wheel axle to said driven mechanism, whereby the rotation of said axle is transmitted to said driven mechanism, substantially as described.

2. In a car, the combination of a car wheel axle, a suitably-supported driven mechanism, and flexible driving means connecting an end of said car wheel axle to said driven mechanism, whereby the rotation of said axle is transmitted to said driven mechanism, substantially as described.

3. In a car, the combination of a car wheel axle, a suitably-supported driven mechanism, and driving means capable of elongation and contraction connecting an end of said car wheel axle to said driven mechanism, whereby the rotation of said axle is transmitted to said driven mechanism, substantially as described.

4. In a car, the combination of a car wheel axle, a driven mechanism on the car-body, and flexible driving means capable of elongation and contraction connecting an end of said car wheel axle to said driven mechanism, whereby the rotation of said axle is transmitted to said driven mechanism and the car truck is permitted to turn relative to the car-body, substantially as described.

5. In a car, the combination of a car wheel axle, a suitably-supported driven mechanism, and a shaft having one or more universal joints connecting an end of said car wheel axle to said driven mechanism, whereby the rotation of said axle is transmitted to said driven mechanism, substantially as described.

6. In a car, the combination of a car wheel axle, a driven mechanism on the car-body, and a shaft connecting an end of said axle to said driven mechanism, whereby the rotation of said axle is transmitted to said driven mechanism, said shaft having one or more universal joints and means to permit its elongation and contraction to permit the truck to turn relative to the car-body, substantially as described.

7. In a car, the combination of a suitably-supported driven mechanism, a car wheel axle, a journal box for said axle, a shaft having a bearing in a wall of said journal box, means connecting the inner end of said shaft to said axle, and means connecting the outer end of said shaft to said driven mechanism, said latter means including a universal joint and a connection capable of elongation and contraction to permit the car truck to turn relative to the car-body, substantially as described.

8. In a car, the combination of a suitably-supported driven mechanism, a car wheel axle, a journal box for said axle, a lid for said journal box equipped with a bearing, a shaft passing through said bearing, means connecting the inner end of said shaft to said axle, a second shaft connecting the outer end of said shaft to said driven mechanism, said second shaft having one or more universal -joints and a connection capable of elongation and contraction to permit the journal box and axle to turn relative to said car-body, substantially as described.

9. In a car, the combination of a suitably-supported driven mechanism, a car wheel axle having an axial aperture in its end, a journal box housing the apertured end of said axle, a lid for said journal box equipped with a socket bearing, a shaft extending through said lid having a ball adapted to fit in said socket bearing to form a ball and socket support for said shaft, a second shaft, a universal joint connecting said second shaft to the inner end of the first-mentioned shaft, the inner end of said second shaft fitting in the aperture of said axle, means to compel said second shaft to rotate with said axle, a third shaft connecting the outer end of said first or lid shaft to said driven mechanism, said third shaft having one or more universal joints and a connection capable of elongation and contraction to compensate for the turning of the car-truck relative to the car-body, substantially as described.

10. In a car, the combination of a suitably-supported driven mechanism, a car wheel axle axially apertured at one end, a shaft one end of which fits in the aperture of said axle, means to transmit the rotation of said axle to said shaft, and means connecting said shaft to said driven mechanism, whereby the rotation of said axle is transmitted to said driven mechanism, substantially as described.

11. In a car, the combination of a car wheel axle, a dynamo on the car body, means to transmit the rotation of said axle to said dynamo, means detachably connecting said dynamo to said car body, and means detachably connecting said dynamo to said transmitting means, whereby the dynamo may be readily detached from the car body, disconnected from the transmitting means by merely lifting the dynamo, and replaced by another dynamo, substantially as described.

As evidence that I claim the foregoing as my invention I have signed the same this 18th day of August, 1906, in the presence of two witnesses.

LOUIS T. MANN.

Witnesses:
WALTER M. FULLER,
FREDERICK C. GOODWIN.